Patented Nov. 25, 1941

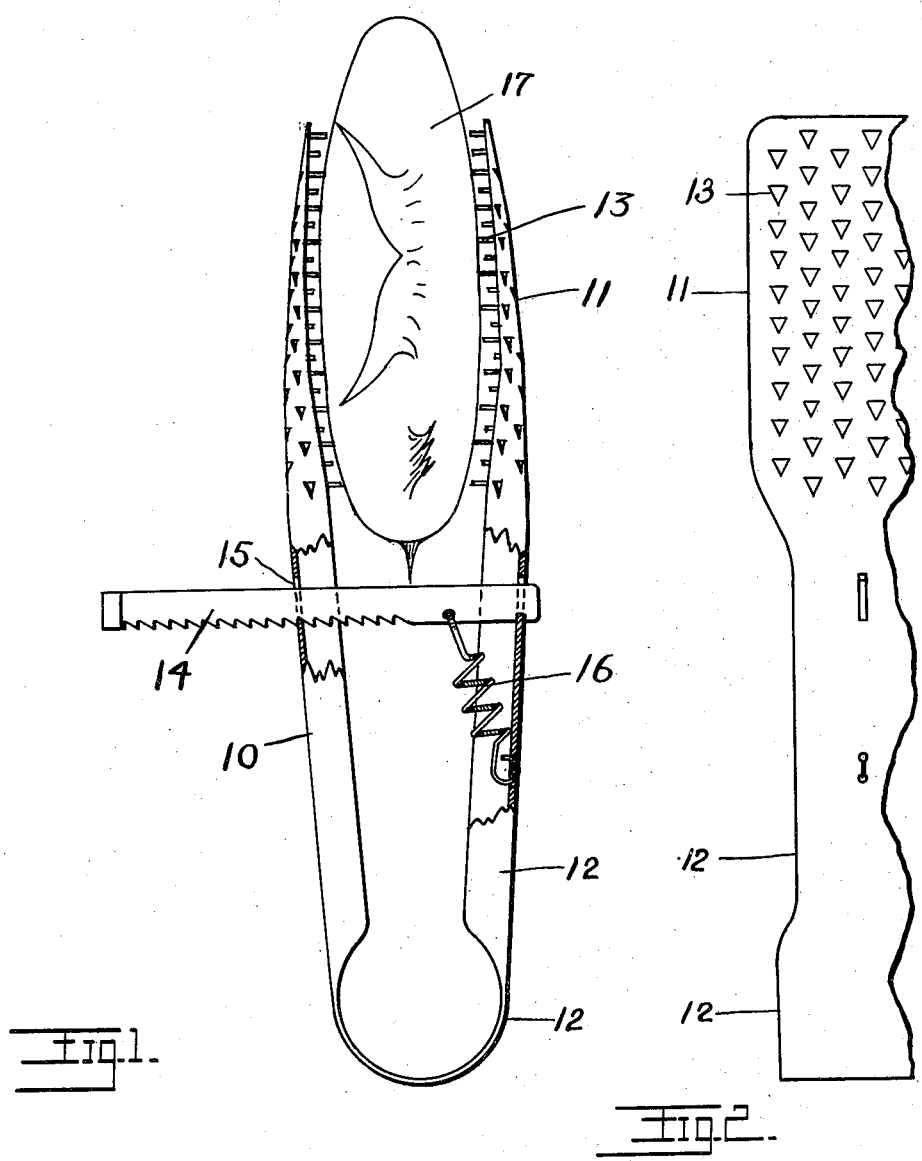

2,263,965

UNITED STATES PATENT OFFICE 2,263,965

FISH HOLDER

John M. Fiori, Poughkeepsie, N. Y.

Application November 1, 1939, Serial No. 302,440

1 Claim. (Cl. 294—99)

My invention relates to a device for use by fishermen for holding a fish while removing the hook from its mouth.

Because of the slippery protective film on fish it is extremely difficult, when removing the hook from their mouths, to get a good grip on them with the fingers to prevent their whipping around and in numerous cases getting free. Some species of fish, such as the cat-fish, have sharp fins and barbels which will inflict serious cuts upon the hand if the fish is not held firmly. This makes removal of the hook very difficult and dangerous, also very messy as the fish's protective film leaves the hands very slimy after touching them. I have therefore provided a device capable of securely gripping the fish and holding it free from movement while the hook is disengaged.

The object of the invention is to provide a device for holding a fish to prevent it from slipping free while disengaging a hook from its mouth.

Another object of the invention is to provide a device which may readily and easily be used for holding a fish while disengaging the hook.

Another object of the invention is to provide a device which will enable fishermen to handle fish without getting their hands covered with cuts and slime.

A still further object is to provide a device simple in construction, cheaply manufactured, and easily and conveniently carried.

With these and other objects in view, my invention consists in certain novel construction and combination of parts as will hereinafter be fully described and claimed and further illustrated in the accompanying drawing which forms a part hereof, and in which like figures of reference refer to corresponding parts in all of the views, and it is understood that slight changes may be made without departing from the spirit of the invention.

In the drawing:

Figure 1 is a side view of the device holding a fish.

Figure 2 is a sectional top view showing the construction of the device.

Referring to the drawing:

My device is composed of a U-shaped piece of tempered sheet metal 10, and is formed from a piece of flat stock bent upon itself, with wide ends 11 tapering to a narrow section 12 in the middle of the piece 10. The edges of the part adjacent the section 12 are bent inwards providing a smooth handle and adding more strength and spring to the U shaped piece 10.

The wide ends or jaws 11 are slightly concave to conform with the curvature of a fish, and provided with protruding points or teeth 13 to firmly and securely grip the fish.

To enable the device to grip the fish without continual hand pressure, I have provided a toothed rack 14, one end swingably connected at right angles to one arm of the U-shaped piece 10. The opposite end of the rack 14 is rolled over to provide a smooth surface by which the said rack may be controlled by the thumb of the user. This free end of the rack passes through the other arm of the piece 10.

I have also provided a coiled spring 16, secured at one end to the rack 14, adjacent its lower end, and the opposite end of the spring secured to the same arm of the piece 10 to which the rack 14 is secured.

The spring 16 will retain the rack 14 in constant contact with the rear edge of the slot 15, thus retaining the jaws 11 in any desired position.

The use of the device for holding the fish during the removal of the hook is extremely simple. The jaws 11 are opened sufficiently to grip the side of the fish 17 by releasing the rack 14 to allow the said jaws 11 to spring apart. Pressure is then exerted upon the handle 12 to close the jaws 11 upon the fish 17 and the teeth of the rack 14 allowed to engage with the edge of the slit 15 locking the fish 17 between the jaws 11, thus holding the fish 17 securely while the hook is removed.

Having thus described my invention, what I claim is new and desire to secure by Letters Patent, is:

A fish holder comprising a body formed from a single length of resilient sheet metal bent intermediate its ends to provide opposed legs, said legs being U-shaped in cross section, one of said legs having a slot therein, a bar having one end pivotally and detachably connected with the other leg, said bar being adapted to engage in the slot and having teeth thereon for engaging a wall of the slot to hold the legs in adjusted positions, a spring connecting the bar with one of the legs, and serving normally to hold the bar pivotally and yieldably in engagement therewith, and spurs formed on the opposed faces of the legs.

JOHN M. FIORI.